Nov. 8, 1955 K. A. SUMMERS Re. 24,086

LINE FEEDER FOR HIGH PRESSURE OIL WELLS

Original Filed Aug. 15, 1949

INVENTOR.
KENNETH A. SUMMERS
BY
Fulwider & Mattingly
Attorneys

United States Patent Office

Re. 24,086
Reissued Nov. 8, 1955

24,086

LINE FEEDER FOR HIGH PRESSURE OIL WELLS

Kenneth A. Summers, Los Angeles, Calif.

Original No. 2,630,180, dated March 3, 1953, Serial No. 110,285, August 15, 1949. Application for reissue November 10, 1954, Serial No. 468,177

5 Claims. (Cl. 166—77)

Matter enclosed in heavy brackets [ ] appears in the original patent but forms no part of this reissue specification; matter printed in italics indicates the additions made by reissue.

My invention relates to line operating device for attachment to the casing head of oil wells under high pressure for the purpose of lowering instruments suspended on the line into the oil well casing.

The invention will be hereinafter described as utilized for the purpose of lowering a casing perforating gun into a well under high pressure, but it is to be understood that this use of the fitting is given by way of example only.

Oil wells, by which term I intend to mean any well drilled into the ground to obtain petroleum products either in liquid or gaseous condition, are capped or closed off at the ground level, with a fitting including valves and packing to control the flow of gas or oil from the well. If the well is under high pressure, the packing around any line or rods working in the casing has to be tightly packed to prevent the loss of high pressure fluid through the packing, thus setting up high frictional forces which are often so high that the weight of a comparatively light instrument, such as a casing perforating gun, is insufficient to pull the line on which it may be suspended through the packing.

It is an object of my invention to provide a device whereby the line suspending an instrument in an oil well under high pressure is positively drawn through the high pressure packing.

A further object of my invention is to provide a device for the purpose of positively drawing a line, suspending an instrument in an oil well under high pressure, through a high pressure packing, the device being arranged so that the oil well pressure, although acting on the parts arranged within the device, acts equally in all directions thereon and therefore cannot effect the functioning of the device.

Another object of my invention is to provide a device for the purpose described, having power operating means incorporated therewith to constitute a self-contained unit which may be quickly and easily positioned on the well casing head for a casing perforating or other operation, and as readily removed after completion of the operation.

Oil well equipment is subjected to hard usage and sometimes unskilled handling and a further object of my invention is to provide a simple and rugged piece of equipment which will give trouble-free service under such conditions.

A still further object of my invention is to provide a device for the purpose described which is easy to operate yet accurate in performance.

Other objects and advantages of my invention will be apparent from a study of the following specification, read in connection with the accompanying drawings, wherein.

Figure 1:
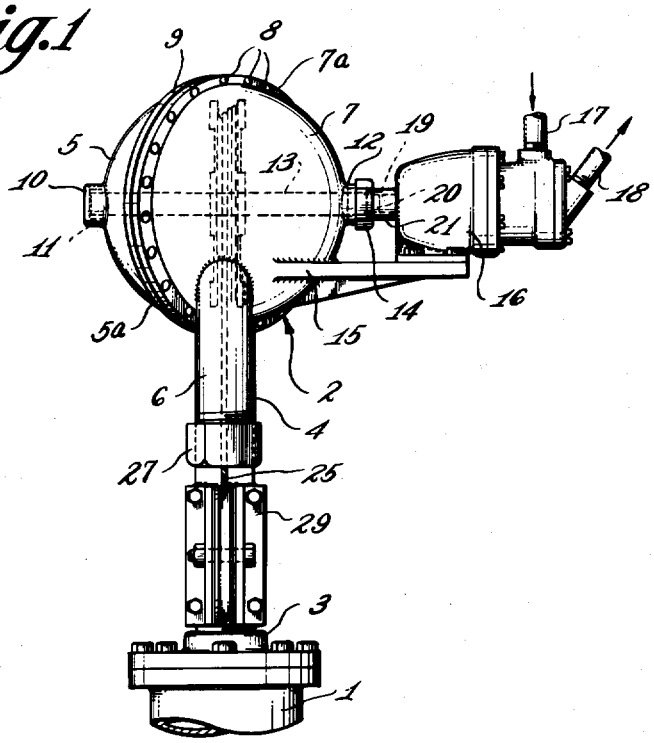
Fig. 1 is a side elevation showing the fitting of my invention mounted on the casing cap; it will be understood that when used on an oil well under high pressure the cap will be furnished with a central valve so that the gun may be lowered therethrough into the casing after the device has been secured in place.
Figure 3:
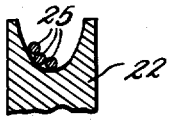
Fig. 3 is a fragmentary detail shown in cross section on the line III—III of Fig. 2.

Referring to the drawings, the numeral 1 indicates the top of a standpipe mounted on the cap of the oil well casing on which the device of my invention, generally indicated at 2, is secured, as for instance by being screwed into a threaded boss 3 of the top plate of the standpipe.

The device of my invention comprises a housing formed by a vertical tubular member 4 secured to a hemispherical member 5 as by welding, and a second tubular vertical member 6 parallel to member 4, member 6 being also secured, as by welding, to a hemispherical member 7 of the same radius as member 5.

Hemispherical members 5 and 7 are secured together by annular marginal flanges 5a and 7a riveted or bolted together, rivets 8 being indicated in the drawings. A pressure retaining gasket 9 is positioned between flanges 5a and 7a.

The plane on which the sphere, comprised of hemispheres 5 and 7, is divided is vertical but inclined to the parallel planes in which the vertical tubular members 4 and 6 extend.

Hemispherical member 5 is provided with a hub 10 machined to provide an interior bearing 11, and hemispherical member 7 is provided with a hub 12 drilled to provide a bearing for a shaft 13, mounted with its inner end supported in bearing 11 and extending through hub 12. The shaft 13 is thus mounted with its axis accurately extending equidistant from the axes of tubular members 4 and 6 and normal to the plane in which they lie.

A pressure retaining gland 14 is provided to close the outer end of bearing in hub 12 against loss of pressure through the bearing.

A laterally projecting bracket 15 is welded to the spherical member and on the bracket is mounted a motor 16, which may be of any suitable type, the motor shown in Fig. 1 being of the wabble plate hydraulic type. The pressure liquid conduit is indicated at 17 and the exhaust liquid conduit is indicated at 18.

Motor 16 drives a shaft 19 which is directly coupled to shaft 13 in any suitable way, as for instance by a key 20 fitting in a keyway cut in the abutting ends of shafts 13 and 19 and retained therein by a sleeve 21 fitting closely over the shafts. The motor is of a commercially available make affording a high torque at a low number of revolutions per minute.

Figure 2:
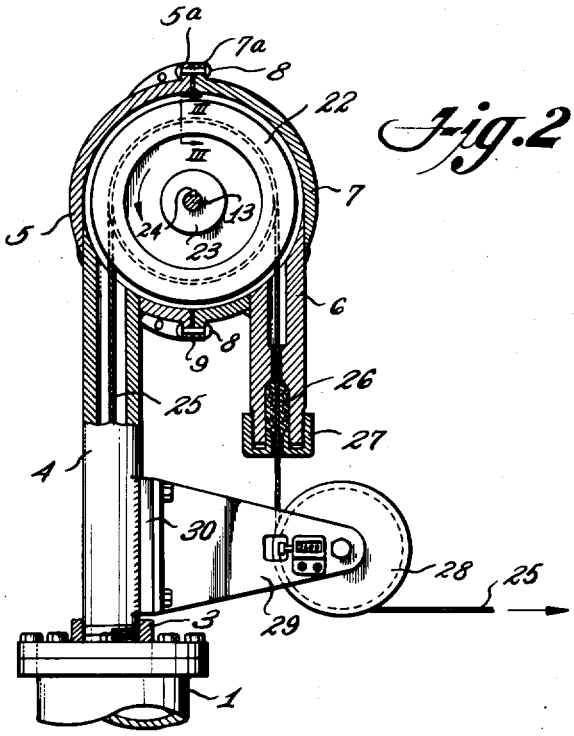
Fig. 2 is a front elevation, partly in section.

A grooved pulley 22 having a hub 23 is mounted on shaft 13 by a key 24 driven into a keyway cut partly in hub 23 and partly in shaft 13. The groove in the periphery of the pulley is arranged to lie over the openings of the vertical tubular members 4 and 6 into the spherical housing 5, 7, so that a fine line, such as cable 25, wound round the pulley will extend along the axes of the tubular members. *Preferably, as clearly shown in the view of Fig. 2, the vertical tubular members 4 and 6 are positioned substantially 180° apart relative to the periphery of the pulley 22, whereby the cable 25 will reverse its direction in passing around an arcuate portion of the pulley between the tubular members 4 and 6.* One end of the cable is secured to the casing perforating gun (not shown) suspended in the oil well casing. The cable 25 [is] *may be* given several turns round the pulley [and the]. *The* other run of the cable is passed through a pressure retaining gland closing the lower end of tubular member 6 and comprising packing 26 positioned in the counterbored end of member 6, and compressed by a follower 27 screwed onto the lower end of member 6, around the surface of the cable.

The cable is held for accurate axial movement through the tubular member 6 and packing gland by a pulley 28 carried in a bracket 29 bolted to a plate 30 welded to the lower end of the tubular member 4.

The free end of cable 25 may be wound on any suitably located drum (not shown). The pulley 28 may be utilized to record the footage of the cable lowered into the well by choosing a pulley one revolution of which could indicate the passage of two feet of cable for instance, a revolution counter of any suitable type being mounted on the bracket and operated by a projection mounted on the pulley 28 in the usual manner.

In operation, when it is decided to perforate the casing of an oil well to increase the flow of oil into the casing, and the gas pressure in the well is relatively high, a length of standpipe long enough to contain the gun is mounted on the casing head, which may be assumed to be of the usual kind provided with one or more lateral flow lines and closed at the top by a plate, the casing head top plate being of course removed.

The gas pressure will not be retained in the standpipe, vertical tubular members, and the spherical member 5, 7, loss of pressure being prevented by the pressure packing 26 at the lower end of vertical member 6, and through bearing 12 by the pressure gland around shaft 13.

The pressure within the member 5, 7, will not cause any deformation thereof because of the spherical form of the member, thus avoiding any misalignment of interior bearing 10 and bearing 12 and insuring that shaft 13 will be free from binding in the bearings. Obviously, since the pressure is applied equally on all sides of the pulley 22, no unbalanced force will be imposed thereon.

The motor 16 is then started by connecting the inlet pipe 17 to a pressure supply, the pressure of which may, however, be quite moderate, and opening a valve controlling the flow of the water.

Since the motor 16 is very readily controlled by the manipulation of the valve and as water under pressure is generally available at drilling locations, I prefer to use the hydraulic type motor shown in the drawings, but any small motor may be incorporated in my device such as an electric motor.

The pulley 22 will be rotated by the motor in a direction to pull the cable 25, [because of the frictional grip due to the turns of the cable about the pulley,] through the packing gland 26 and will lower the gun into the well casing to the predetermined depth, after which the charges in the gun will be fired and the gun drawn again into the standpipe by winding up the cable 25 on its reel.

While I have shown and described in the preferred embodiment of my invention, I do not desire to be limited to any of the details of construction shown and described herein, except as defined in the appended claims.

I claim:

1. A line operating device for use in gun casing perforating operations and the like in wells under high pressure, the gun and the like being suspended on the line, including: a spherical housing formed of two separate parts secured together in pressure-tight relation; means for mounting said housing on the casing head of a well, said means being formed on one part of the spherical housing and being arranged to enable the line to run into the well from within the spherical housing; a first pressure-tight bearing mounted on the same part of the spherical housing as the mounting means for said housing; a second pressure-tight bearing mounted on the other part of the spherical housing; pressure-tight means for guiding line through the wall of the part of the housing on which the second pressure-tight bearing is mounted; a rotatable shaft mounted in said bearings and extending outwardly through one of the bearings; a grooved pulley within said housing secured on said shaft for rotation therewith, the line being run through the pressure-tight guiding means and wound on said pulley a plurality of turns; and means arranged outside said housing for rotating the pulley shaft to pull line into the housing and lower it into the well.

2. A line operating device for use in gun casing perforating operations and the like in wells under high pressure, the gun and the like being suspended on the line, including: a spherical housing formed of two separate parts secured together in pressure-tight relation; means for mounting said housing on the casing head of a well, said means being formed on one part of the spherical housing and being arranged to enable the line to run into the well from within the spherical housing; a first pressure-tight bearing mounted on the same part of the spherical housing as the mounting means for said housing; a second pressure-tight bearing mounted on the other part of the spherical housing; pressure-tight means for guiding line through the wall of the part of the housing on which the second pressure-tight bearing is mounted; a rotatable shaft mounted in said bearings and extending outwardly through one of the bearings; a grooved pulley within said housing secured on said shaft for rotation therewith, the line being run through the pressure-tight guiding means and wound on said pulley a plurality of turns; a bracket extending outwardly from the part of the housing through which the shaft extends; and a motor mounted on said bracket and effective to rotate said shaft.

3. A line operating device for use in gun casing perforating operations and the like in wells under high pressure, the gun and the like being suspended on the line, including: a spherical housing formed of semi-spherical parts secured together in pressure-tight relation; a tubular extension of one semi-spherical part arranged to mount the housing on the casing head of a well and placing the interior of the housing in communication with the interior of the well casing; a first pressure-tight bearing mounted on the same semi-spherical part of the housing as said tubular extension; a rotatable shaft extending through said first pressure-tight bearing; a second pressure-tight bearing mounted on the other semispherical part of the housing and supporting the end of said shaft; a second tubular extension projecting from the same semispherical part as that on which the second pressure-tight bearing is mounted and arranged parallel to the first tubular extension; a grooved pulley within said housing secured on said shaft for rotation therewith and with its rim in tangential relation to said tubular extensions, the line being run through said second tubular extension and wound on said grooved pulley a plurality of times and run the tubular mounting extension into the well; a pressure-tight packing gland in said second tubular extension through which the line is pulled; a bracket extending outwardly from the semispherical part through which the shaft extends; a motor mounted on said bracket and effective to rotate said shaft; a second bracket projecting from the tubular mounting extension; and a line guiding grooved pulley mounted on said bracket, the line being run from a line reel around said line guiding pulley and directed thereby axially into said second tubular extension.

4. A line operating device for use in gun casing perforating operations and the like in wells under high pressure, including a pressure-tight housing having a portion adapted for sealed connection with the casing head of a well, said housing having a line ingress and egress port remote from the casing connection portion, the port, when a line of suitable size is extended through it, forming a pressure seal about the line, and a line withdrawing device carried by the housing and having a line engaging and pulling [portion] *pulley* sealed within the housing and located between the casing connection portion and the line ingress and egress port, *said pulley having a peripheral groove frictionally engaging said line for an arcuate distance of at least 180°, and* said line withdrawing device including a drive member connected to the line engaging and pulling portion and extending exteriorly of the housing in pressure sealed relationship thereto.

*5. A line operating device, according to claim 4, in which said line ingress and egress port is positioned substantially 180° from said casing connection portion relative to said peripheral groove, whereby said line reverses*

*its direction in passing from said line ingress and egress port to said casing connection portion.*

References Cited in the file of this patent or the original patent

UNITED STATES PATENTS

| | | |
|---|---|---|
| 1,359,763 | Smith | Nov. 23, 1920 |
| 1,630,826 | Brooks | May 31, 1927 |
| 1,817,201 | Minor | Aug. 4, 1931 |
| 2,218,955 | Johnson | Oct. 22, 1940 |
| 2,226,060 | Johnson, Jr. | Dec. 24, 1940 |
| 2,262,364 | Hugel et al. | Nov. 11, 1941 |